United States Patent [19]
Iida et al.

[11] Patent Number: 5,994,262
[45] Date of Patent: Nov. 30, 1999

[54] SHEET SET FOR TEMPERATURE CONTROL AND METHOD OF USING THEREOF

[75] Inventors: Takeshi Iida; Tetsuo Tsuchida, both of Amagasaki, Japan

[73] Assignee: OJI Paper Co., Ltd., Tokyo, Japan

[21] Appl. No.: 09/095,933

[22] Filed: Jun. 12, 1998

[30] Foreign Application Priority Data

| Jun. 18, 1997 | [JP] | Japan | 9-161012 |
| Jul. 3, 1997 | [JP] | Japan | 9-178412 |
| Mar. 19, 1998 | [JP] | Japan | 10-070008 |

[51] Int. Cl.$^6$ .......................... B41M 5/128; B41M 5/155
[52] U.S. Cl. .......................... 503/212; 503/205; 503/208; 503/209; 503/214; 503/216; 503/226
[58] Field of Search ...................... 427/150–152; 503/205, 208, 209, 214, 216, 226, 210–212

[56] References Cited

U.S. PATENT DOCUMENTS 5,888,929  3/1999  Iida et al. ................ 503/201

OTHER PUBLICATIONS

Abstract of Japanese Patent Laid–open Publication No. 63–277,944 A, Date of Publication: Nov. 15, 1988.

*Primary Examiner*—Bruce H. Hess
*Attorney, Agent, or Firm*—Kubovcik & Kubovcik

[57] ABSTRACT

A sheet set for temperature control comprises: a recording sheet that is provided on one surface of a substrate and has a recording layer incorporating a zinc salt of a salicylic acid derivative as a color acceptor, or a leuco dye; and an adhesive sheet that is provided on one surface of another substrate and has a first adhesive layer incorporating an adhesive, an ester derivative of the formula (1) or (2), and a leuco dye, or a zinc salt of a salicylic acid derivative as a color acceptor.

8 Claims, No Drawings

SHEET SET FOR TEMPERATURE CONTROL AND METHOD OF USING THEREOF

The present invention relates to sheet sets for preservation temperature control that can simply check whether articles or storage spaces requiring temperature controls have been kept below a predetermined temperature.

There has been a variety of articles whose display, preservation, transportation and the like are subject to strict temperature controls. Particularly, in recent years, large quantities of frozen foods and cold-storage foods have appeared on the market because of their convenience and simplicity, but handling of these foods requires strict temperature controls. Unless, after manufacturing frozen foods or cold-storage foods, they are controlled below each specific temperature in the course of transportation and preservation until they are transferred to homes, decay occurs due to the deterioration of the contents or the reproduction of various germs. If, however, deteriorated ones are preserved again at low temperature, they are indistinguishable in appearance from non-deteriorated ones. This may arise serious social problems.

In addition to frozen foods and cold-storage foods, examples of articles requiring such strict temperature controls include natural flowers, medicines, photographic chemicals, chemicals, and foods. Presently, however, it is difficult to check whether after manufacture of articles requiring strict temperature controls, which are represented by frozen foods and cold-storage foods, they are transferred to consumers in strict accordance with necessary temperature controls. Therefore, related industries demand concrete temperature control systems.

As a method of obtaining temperature control systems for frozen foods and the like, JP-A-61186/1973 proposes a method of detecting changes in shape or color tone (in combination with coloring materials) at the time of melting. JP-A-55236/1985 proposes a method of disposing, in this order, a sheet containing Component (A) that melts at a predetermined temperature, a diaphragm through which melted Component (A) can transmit, and a sheet containing Component (B) that causes discoloration by the contact with Component (A). These methods, however, have problems in formed color density and the like, thus failing to provide those for practical applications.

An object of the present invention is to provide temperature control sheet sets that can easily check whether articles or storage spaces requiring temperature controls have been kept below a predetermined temperature.

The present invention provides a sheet set for temperature control comprising:
- a recording sheet on one surface of a substrate, the recording sheet having a recording layer incorporating a zinc salt of a salicylic acid derivative; and
- an adhesive sheet on one surface of another substrate, the adhesive sheet having a first adhesive layer incorporating an adhesive, a leuco dye, and at least one of ester derivatives of the formula (1) or formula (2)

$$R_1\text{—COO—}R_2 \qquad (1)$$

wherein $R_1$ is $C_9$~$C_{17}$ alkyl, and $R_2$ is $C_1$~$C_{12}$ alkyl or benzyl, $$R_3\text{—OOC—}R_5\text{COO—}R_4 \qquad (2)$$

wherein $R_3$ and $R_4$ are each $C_1$~$C_{18}$ alkyl or benzyl, and $R_5$ is $C_0$~$C_{10}$ alkylene.

The present invention also provides a sheet set for temperature control comprising:

- a recording sheet on one surface of a substrate, the recording sheet having a recording layer incorporating a leuco dye; and
- an adhesive sheet on one surface of another substrate, the adhesive sheet having a first adhesive layer incorporating an adhesive, a zinc salt of a salicylic acid derivative, and at least one of the above ester derivatives of the formula (1) or (2).

The present invention further provides a sheet set for temperature control comprising:
- a recording sheet on one surface of a substrate, the recording sheet having a recording layer incorporating a leuco dye and a zinc salt of a salicylic acid derivative; and
- an adhesive sheet on one surface of another substrate, the adhesive sheet having a first adhesive layer incorporating an adhesive and at least one of the above ester derivatives of the formula (1) or (2).

According to the present invention, a sheet set for temperature control comprises: a recording sheet that is provided on one surface of a substrate and has a recording layer incorporating a zinc salt of a salicylic acid derivative as a color acceptor, or a leuco dye; and an adhesive sheet that is provided on one surface of another substrate and has a first adhesive layer incorporating an adhesive, an ester derivative of the formula (1) or (2) (hereinafter referred to as a specific ester derivative), and a leuco dye, or a zinc salt of a salicylic acid derivative as a color acceptor. When the above sheet set is used, the recording sheet and the adhesive sheet are laminated on the surface of the recording layer through the first adhesive layer, permitting an easy and precise detection of a preservation temperature. It is noted that when a zinc salt of a salicylic acid derivative is contained in the recording layer, a leuco dye is contained in the adhesive layer, alternatively, when a leuco dye is contained in the recording layer, a zinc salt of a salicylic acid derivative is contained in the adhesive layer.

According to another aspect of the present invention, a sheet set for temperature control comprises: a recording sheet that is provided on one surface of a substrate and has a recording layer incorporating a leuco dye and a zinc salt of a salicylic acid derivative; and an adhesive sheet that is provided on one surface of another substrate and has a first adhesive layer incorporating an adhesive and an ester derivative of the formula (1) or (2).

The sheet set for temperature control is directed to control the preservation temperatures of articles or places (rooms) by laminating the adhesive sheet on the recording layer of the recording sheet through the first adhesive layer of the adhesive sheet. For instance, if the adhesive sheet is laminated on the recording sheet through the first adhesive layer of the adhesive sheet (only the first adhesive layer of the adhesive sheet may be laminated), it is hardly colored while being left at temperatures of not more than a predetermined temperature, but is colored gradually if it exceeds the predetermined temperature. The detected temperature and time can be controlled by suitably selecting a leuco dye, color acceptor, ester derivative, or the like.

In the present invention, as a substrate for use in heat sensitive recording sheets and adhesive sheets, there are papers, films, synthetic papers, laminate papers and the like, which has a thickness of about 25 to 250 μm. The surface of a substrate may be submitted to a corona discharge, an anchor coat layer may be provided, or a substrate may be colored.

Various known rubber adhesives or acrylic resin adhesives containing butyl (meth)acrylate, 2-ethylhexyl (meth)

acrylate, etc. are incorporated as a main component into the first adhesive layer of the invention.

Examples of rubber adhesives are natural rubber, isoprene rubber, styrene-butadiene block copolymer, styrene-isoprene-styrene block copolymer, butyl rubber, styrene-ethylene-styrene block copolymer, polyisobutylene, polyvinyl isobutyl ether, chloroprene rubber and nitrile rubber.

Among these adhesives especially preferable is an acrylic resin adhesive which is excellent in adhesiveness, transparency and the like.

To the first adhesive layer can be added as required a tackifier such as rosin and like natural resin, modified rosin, derivatives of rosin and modified rosin, polyterpene resin, modified terpene, aliphatic hydrocarbon resin, cyclopentadiene resin, aromatic petroleum resin, phenol resin, alkylphenol-acetylene resin, coumarone-indene resin and vinyltoluene-α-methylstyrene copolymer, antioxidant, stabilizer, softener, filler (pigment), coloring agent, etc.

When a substrate for use in an adhesive sheet is opaque, it is desirable that an adhesive has removability. As a removable adhesive, styrene-isoprene-styrene-block copolymers are suitable because they have a large cohesive force in despite of their low molecular weights. More preferable are two-pack crosslinking type acrylic adhesives. Combining a two-pack crosslinking type acrylic adhesive with a suitable crosslinking agent such as an epoxy derivative, provides the following advantages. Specifically, when applied to the rear surface of a substrate, the crosslinking of an adhesive is not proceeded so that a certain amount of the adhesive penetrate the substrate, resulting in a suitable crosslinking of the adhesive is proceeded, there is an increase in cohesive force that leads to removability. In this type, it is easy to control adhesion and removability by selecting the type of acryls and crosslinking agents to be used.

Although the amount of a specific ester derivative used in the first adhesive layer is not particularly limited, it is preferably from 3 to 30% by weight based on an adhesive. Below 3% by weight, color forming ability may degrade. Over 30% by weight, the adhesive property of the first adhesive layer may degrade. In the formula (1) or (2) for a specific ester derivative, when the carbon number of $R_1$ is less than 9, a specific ester derivative in the first adhesive layer vaporizes gradually and its color forming ability degrades with time. When the carbon numbers of $R_1$, $R_3$, $R_4$ and $R_5$ exceed 17, 18, 18 and 12 respectively, an ester derivative causes a phase separation from an adhesive, thus lowering adhesive property.

The specific ester derivatives are excellent in the compatibility and stability to an adhesive, the adhesive property and transparency during freeze-preservation, the solubility to a leuco dye and/or salicylic acid derivative, the ease of temperature and time controls, and the like.

Examples of ester derivatives of the formula (1) are ethyl caprate, n-butyl caprate, isobutyl caprate, n-hexyl caprate, n-heptyl caprate, n-decyl caprate, methyl laurate, ethyl laurate, n-butyl laurate, isobutyl laurate, n-hexyl laurate, n-heptyl laurate, n-decyl laurate, methyl palmitate, ethyl palmitate, isopropyl palmitate, n-butyl palmitate, isobutyl palmitate, n-hexyl palmitate, heptyl palmitate, n-decyl palmitate, methyl stearate, ethyl stearate, n-butyl stearate, n-heptyl stearate, benzyl caprate, benzyl laurate, and benzyl stearate.

Examples of ester derivatives of the formula (2) are dibutyl oxalate, dipentyl oxalate, dihexyl oxalate, di-t-butyl malonate, dioctyl malonate, dibutyl succinate, dipentyl succinate, diethyl glutarate, dipentyl glutarate, dibutyl adipate, dipentyl adipate, dihexyl adipate, dioctyl adipate, didecyl adipate, didodecyl adipate, dioctadecyl adipate, diethyl pimelate, dipentyl pimelate, diethyl sebacate, dibutyl sebacate, dimethyl azelate, diethyl azelate, dipropyl azelate, dibutyl azelate, dipentyl azelate, dimethyl octanedicarboxylate, dimethyl nonanedicarboxylate, diethyl nonanedicarboxylate, diisobutyl nonanedicarboxylate, diethyl decanedicarboxylate, dipropyl decanedicarboxylate, dibutyl decanedicarboxylate, dipentyl decanedicarboxylate, dihexyl decanedicarboxylate, di(1-ethylpropyl) decanedicarboxylate, and benzylbutyl decanedicarboxylate.

The ester derivatives are not limited to the above, and they can be used in at least two thereof as required.

Various known dyes are usable as a leuco dye contained in the recording layer of the recording sheet or in the first adhesive layer of the adhesive sheet. Examples thereof are as follows.

3-(N-ethyl-N-isoamylamino)-6-methyl-7-anilinofluoran, 3-diethylamino-7-(m-trifluoromethylanilino)fluoran, 3-(N-ethyl-N-isoamylamino)-7-(o-chloroanilino) fluoran, 3-diethylamino-6-methyl-7-anilinofluoran, 3-di-n-butylamino-6-methyl-7-anilinofluoran, 3-di-n-pentylamino-6-methyl-7-anilinofluoran, 3-[N-(3-ethoxypropyl)-N-ethylamino]-6-methyl-7-anilinofluoran, 3-[N-(3-ethoxypropyl)-N-methylamino]-6-methyl-7-anilinofluoran, 3-(N-ethyl-p-toluidino)-6-methyl-7-anilinofluoran, 3-(N-ethyl-p-toluidino)-6-methyl-7-(p-toluidino)fluoran, 3-diethylamino-6-methyl-7-(2,4-xylidino)fluoran, 3-diethylamino-7-(o-chloroanilino)fluoran, 3-di-n-butylamino-7-(o-chloroanilino)fluoran, 3-di-n-butylamino-7-(o-fluoroanilino)fluoran, 3-(N-ethyl-N-cyclopentylamino)-6-methyl-7-anilinofluoran, 3-diethylamino-6-chloro-7-anilinofluoran, 3-(N-cyclohexyl-N-methylamino)-6-methyl-7-anilinofluoran, 3-pyrrolidino-6-methyl-7-anilinofluoran, 3-diethylamino-6-methyl-7-(2,6-xylidino)fluoran, 3-(N-methyl-N-n-propylamino)-6-methyl-7-anilinofluoran, 2,2-bis{4-[6'-(N-cyclohexyl-N-methylamino)-3'-methylspiro-(phthalide-3,9'-xanthene)-2'-ylamino]phenyl}propane, 3-diethylamino-6-methyl-7-chlorofluoran, 3-diethylamino-7-chlorofluoran, 3-diethylamino-6,7-dimethylfluoran, 3,3'-bis(1-ethyl-2-methylindole-3-yl) phthalide, 3,3'-bis(1-n-butyl-2-methylindole-3-yl) phthalide, 3,3-bis(4-dimethylaminophenyl)-6-dimethylaminophthalide, 3-(4-dimethylamino-2-methylphenyl)-3-(4-dimethylaminophenyl)-6-dimethylaminophthalide, 3,7-bis(dimethylamino)-10-benzoylphenotiazine, 3,3-bis[1-(4-methoxyphenyl)-1-(4-dimethylaminophenyl)ethylene-2-yl]-4,5,6,7-tetrachlorophthalide, 3,3'-bis(4-diethylamino-2-ethoxyphenyl)-4-azaphthalide, 3-di-n-pentylamino-6,8,8-trimethyl-9-ethyl-8,9-dihydro-(3,2,e) pyridofluoran, 3-di-n-butylamino-6,8,8-trimethyl-9-ethyl-8,9-dihydro-(3,2,e)pyridofluoran, 3-[1,1-bis(4-diethylaminophenyl)ethylene-2-yl]-6-dimethylaminophthalide, 3-(4-dimethylaminophenyl) amino-5,7-dimethylfluoran, 3-(4-dibutylaminophenyl) amino-6-methyl-7-chlorofluoran, 3-(1-ethyl-2-methylindole-3-yl)-3-(2-ethoxy-4-diethylaminophenyl)-4-azaphthalide, 3-(1-methyl-2-phenylindole-3-yl)-3-(2-methyl-4-diethylaminophenyl)-4,7-diazaphthalide, 3-(1-ethyl-2-methylindole-3-yl)-3-(4-diethylamino-2-methylphenyl)-4-azaphthalide and 3-(1-n-octyl-2-methylindole-3-yl)-3-(4-diethylamino-2-ethoxyphenyl)-4-azaphthalide.

The leuco dyes are not limited to the above and can be used in at least two of them as required. The leuco dye, when contained in the first adhesive layer, can be used in an amount of preferably 1 to 30 wt. % based on the first adhesive layer although not specifically limited. The leuco dye, when contained in the recording layer, can be used in an amount of preferably 5 to 35 wt. % based on the recording layer although not specifically limited.

The first adhesive layer is formed by coating and drying, on one surface of another substrate or a released layer of a release sheet, a coating composition for a first adhesive layer in which an adhesive, a specific ester derivative, and a leuco dye or a zinc salt of a salicylic acid derivative as required, are dissolved in an organic solvent, so that the amount after drying is approximately in the range of 5 to 30 $g/m^2$, preferably 10 to 25 $g/m^2$.

Alternatively, an adhesive sheet of the roll type requiring no release sheet can be obtained by providing a released layer mainly composed of a silicone resin on the other surface of another substrate.

As a method of manufacturing the first adhesive sheet, there can utilize a transfer procedure in which a first adhesive layer is formed on a release paper and a substrate is then laminated thereto, or a direct procedure in which an adhesive is applied directly to a substrate and a release paper is then laminated thereto. In addition, various other known techniques in the field of manufacturing adhesive sheets are applicable.

The present invention selectively uses as a color acceptor zinc salt of salicylic acid derivative in a recording layer of recording sheet, or in an adhesive layer of adhesive sheet.

Examples of salicylic acid derivative are 3-methyl-5-($\alpha$-methylbenzyl)salicylic acid, 3-methyl-5-($\alpha,\alpha$-dimethylbenzyl)salicylic acid, 3,5-di-tert-butyl-salicylic acid, 3,5-di-tert-butyl-6-methylsalicylic acid, 3,5-di-tert-butyl-6-phenylsalicylic acid, 3,5-di-tert-amyl-salicylic acid, 3,5-di-cyclohexylsalicylic acid, 3-cyclohexyl-5-($\alpha$-methylbenzyl)salicylic acid, 3-dodecylsalicylic acid, 3-methyl-5-dodecylsalicylic acid, 3-dodecyl-6-methylsalicylic acid, 3-phenyl-5-($\alpha$-methylbenzyl)salicylic acid, 3-phenyl-5-($\alpha,\alpha$-dimethylbenzyl)salicylic acid, 3-($\alpha$-methylbenzyl)-salicylic acid, 3-($\alpha$-methylbenzyl)-5-methylsalicylic acid, 3-($\alpha$-methylbenzyl)-5-phenylsalicylic acid, 3-($\alpha,\alpha$-dimethylbenzyl)-5-methylsalicylic acid, 3-($\alpha,\alpha$-dimethylbenzyl)-6-methylsalicylic acid, 3,5-di($\alpha,\alpha$-dimethylbenzyl)salicylic acid, 3,5-di($\alpha$-methylbenzyl)salicylic acid, 3-($\alpha$-methylbenzyl)-5-($\alpha,\alpha$-dimethylbenzyl)salicylic acid, 3-($\alpha$-methylbenzyl)-5-bromosalicylic acid, 3-($\alpha$-methylbenzyl)-4-methylsalicylic acid, 3-($\alpha$-methylbenzyl)-6-methylsalicylic acid, 3-nonylsalicylic acid, 3,5-dinonylsalicylic acid, 3-nonyl-5-methylsalicylic acid, 3-nonyl-6-methylsalicylic acid, 3-nonyl-5-phenylsalicylic acid, 3-methyl-5-nonylsalicylic acid, 5-(4-mesitylmethylbenzyl)salicylic acid, terpenized salicylic acid and benzylated styrenized salicylic acid.

The zinc salt of salicylic acid can be used in at least two of them as required. The salt, when contained in the first adhesive layer, can be used in an amount of preferably 1 to 30 wt. % based on the first adhesive layer although not specifically limited. The salt, when contained in the recording layer, can be used in an amount of preferably 10 to 70 wt. % based on the recording layer although not specifically limited.

Among these zinc salts of salicylic acid especially preferable are zinc salt of 3,5-di($\alpha$-methylbenzyl)salicylic acid, zinc salt of terpenized salicylic acid and zinc salt of benzylated styrenized salicylic acid which are excellent in color forming ability or preservability of recorded images.

The coating composition for the recording layer is prepared by admixing together zinc salt of salicylic acid derivative and/or leuco dye with water serving as a dispersing medium to obtain a dispersion having an average particle size of up to 3 $\mu$m, and adding an adhesive with stirring. The recording layer is formed by coating and drying the above composition on the substrate in an amount of about 2 to 10 $g/m^2$.

Examples of adhesives are starch, casein, gum arabic, carboxymethyl cellulose, completely (or incompletely) saponified polyvinyl alcohol, silicon-modified polyvinyl alcohol, acetoacetylated polyvinyl alcohol, carboxy-modified polyvinyl alcohol, styrene-butadiene copolymer type latex and vinyl acetate type latex.

Further, it is possible to add additives to the coating composition for the recording layer as required. Examples of additives are pigments such as zinc oxide, magnesium carbonate, titanium oxide, aluminum hydroxide, calcium carbonate, magnesium sulfate, calcium sulfate and amorphous silica, heat-fusible substances such as caproic acid amid, benzanilide, 2-benzyloxynaphthalene, 1,2-diphenoxyethane, 1,2-bis(3-methylphenoxy)ethane, dibenzyl oxalate, 2-(2'-hydroxy-5'-methylphenyl)benzotriazole and 2-hydroxy-4-benzyloxybenzophenone, insolubilizer, surfactant, lubricant, fluorescent dye, etc.

The method of coating a composition for the first adhesive layer and recording layer is not limited specifically. Examples of suitable coating methods include reverse roll coating, knife coating, bar coating, slot die coating, reverse gravure coating and vario gravure coating.

By providing a second adhesive layer on the other surface (the rear surface) of a heat sensitive recording sheet, the sheet sets for temperature control are usable by laminating them to articles. For second adhesive layers, similar adhesives to be used in the first adhesive layer described later are used. A second adhesive layer to be provided on the rear surface of a heat sensitive recording layer is applied to the rear surface of a heat sensitive recording sheet or the surface of a released paper by a roll coater, dye coater, gravure coater, screen printer or the like. The amount of the second adhesive layer is approximately in the range of 10 to 40 $g/m^2$, preferably 15 to 25 $g/m^2$, based on dry weight.

The invention will be described below in more detail with reference to examples without limiting the scope thereof. In the followings, parts and percentages are all by weight, unless otherwise specified.

EXAMPLE 1

Preparation of Recording Sheet

A coating composition for a recording layer was prepared by mixing together with stirring a composition comprising 50 parts of 40% dispersion of zinc salt of 3,5-di($\alpha$-methylbenzyl)salicylic acid (mean particle size: 1.2 g m), 80 parts of kaolin, 1 part of magnesium oxide, 20 parts (as solid) of carboxylated styrene-butadiene copolymer latex, 1 part of sodium carboxymethyl cellulose, and 200 parts of water. Then, the coating composition was applied and dried by an air knife coater in an amount of 5 $g/m^2$, on one surface of a synthetic paper (trade name: YUPO FPG-60, Ohji Yuka Goseishi Co., Ltd.), followed by a calendar treatment, to obtain a recording sheet.

Preparation of Adhesive Sheet

An acrylic adhesive was obtained by polymerizing 65 parts of butyl acrylate, 34 parts of 2-ethylhexylacrylate and 1 part of acrylic acid. A coating composition for a first adhesive layer was prepared by mixing together with stirring a composition comprising 50 parts of the above acrylic adhesive, 15 parts of tackifier (trade name: Tamanol 803L, Arakawa Kagaku Kogyo Co., Ltd.), 2 parts of polyisocyanate containing crosslinking agent (trade name: Coronate L, Polyurethane Co., Ltd.), 10 parts of methyl myristate, 5 parts of 3,3-bis(4-dimethylaminophenyl)-6-dimethylaminophthalide, and 231 parts of toluene. Then, the coating composition was coated and dried by a reverse roll coater in an amount of 15 g/m$^2$ on the surface of a released layer of a commercially available release paper, to form a first adhesive layer, which was then laminated to a polyester film of 50 μm thick, thereby obtaining an adhesive sheet.

Preparation of Sheet Set for Temperature Control

The above recording sheet and adhesive sheet were set to obtain a sheet set for temperature control.

EXAMPLES 2 TO 9

Sheet sets for temperature control were prepared in the same manner as in Example 1 except that the following compounds were used in place of 10 parts of methyl myristate in the preparation of the adhesive sheet.

Example 2: 10 parts of n-decyl caprate

Example 3: 10 parts of benzyl laurate

Example 4: 10 parts of methyl stearate

Example 5: 10 parts of ethyl stearate

Example 6: 3 parts of dihexyl adipate, 4 parts of dioctyl adipate and 3 parts of didecyl adipate Example 7: 10 parts of di(1-ethylpropyl) decanedicarboxylate Example 8: 10 parts of benzylbutyl decanedicarboxylate Example 9: 10 parts of dibutyl sebacate

EXAMPLES 10 TO 12

Sheet sets for temperature control were prepared in the same manner as in Example 1 except that the following dispersions were used in place of 50 parts of 40% dispersion of zinc salt of 3,5-di(α-methylbenzyl)salicylic acid in the preparation of the recording sheet.

Example 10: 50 parts of zinc salt of terpenized salicylic acid

Example 11: 50 parts of zinc salt of benzylated styrenized salicylic acid

Example 12: 40 parts of 40% dispersion of zinc salt of 3,5-di(α-methylbenzyl)salicylic acid and 10 parts of 40% dispersion of zinc salt of 3,5-dinonylsalicylic acid

EXAMPLE 13

A sheet set for temperature control was obtained in the same manner as in Example 1 except that a neutral wood-free paper of 54 g/m$^2$ was used in place of the synthetic paper (YUPO FPG-60).

EXAMPLE 14

A sheet set for temperature control was obtained in the same manner as in Example 1 except that 12 parts of 40% dispersion of 3,3-bis(4-dimethylaminophenyl)-6-dimethylaminophthalide (mean particle size: 2 p m) was used in place of 50 parts of 40% dispersion of zinc salt of 3,5-di(α-methylbenzyl)salicylic acid (mean particle size: 1.2 μm), to obtain a recording sheet, and 15 parts of zinc salt of 3,5-di(α-methylbenzyl) salicylic acid was used in place of 5 parts of 3,3-bis(4-dimethylaminophenyl)-6-dimethylaminophthalide, to obtain an adhesive sheet.

EXAMPLE 15

A sheet set for temperature control was obtained in the same manner as in Example 1 except that a coating composition for a second adhesive layer which comprises an acrylic adhesive latex having a solid content of 40% was coated and dried by a reverse roll coater in an amount of 20 g/m$^2$ after drying, on the surface of a released layer of a commercially available release paper, to form a second adhesive layer, which was then laminated to the other surface of the synthetic paper of the recording sheet prepared in Example 1, thereby obtaining a recording sheet.

EXAMPLE 16

An acrylic adhesive was obtained by polymerizing 65 parts of butyl acrylate, 34 parts of 2-ethylhexylacrylate and 1 part of acrylic acid. A sheet set for temperature control was obtained in the same manner as in Example 1 except that a coating composition for a second adhesive layer was prepared by mixing together with stirring a composition comprising 50 parts of the above acrylic adhesive, 15 parts of tackifier (Tamanol 803L), 2 parts of polyisocyanate containing crosslinking agent (trade name: Coronate L, Polyurethane Co., Ltd.), and 200 parts of toluene, thereafter, the coating composition was coated and dried by a reverse roll coater in an amount of 15 g/m$^2$ after drying on the surface of a released layer of a polyester film of 50 g m thick, to form a second adhesive layer, which was then laminated to the other surface of the polyester film of the adhesive sheet prepared in Example 1, thereby obtaining an adhesive sheet.

EXAMPLE 17

Preparation of Recording Sheet
Preparation of Composition A

A composition comprising 10 parts of 3,3-bis(4-dimethylaminophenyl)-6-dimethylaminophthalide, 3 parts of 5% aqueous solution of methyl cellulose and 27 parts of water was pulverized by a sand mill to obtain Composition A having an average particle size of 0.8 μm.

Preparation of Composition B

A composition comprising 20 parts of zinc salt of 3,5-di(α-methylbenzyl)salicylic acid, 5 parts of 5% aqueous solution of methyl cellulose and 55 parts of water was pulverized by a sand mill to obtain Composition B having an average particle size of 1.2 μm.

Preparation of Recording Sheet

A coating composition for a recording sheet was prepared by mixing together with stirring 40 parts of Composition A, 80 parts of Composition B, 10 parts of precipitated calcium carbonate, 20 parts of amorphous silica (oil absorption: 180 ml/100 g), 15 parts of 30% dispersion of zinc stearate and 100 parts of 15% aqueous solution of polyvinyl alcohol.

The coating composition was coated and dried in an amount of 4 g/m$^2$ after drying on one surface (top surface) of a neutral wood-free paper, to form a recording layer, which was then subjected to a supercalendar treatment, thereby obtaining a recording sheet.

Preparation of Adhesive Sheet

An acrylic adhesive was obtained by polymerizing 65 parts of butyl acrylate, 34 parts of 2-ethylhexylacrylate and 1 part of acrylic acid. A coating composition for an adhesive layer was prepared by mixing together with stirring a composition comprising 50 parts of the above acrylic adhesive, 15 parts of tackifier (Tamanol 803L), 2 parts of polyisocyanate containing crosslinking agent (Coronate L), 10 parts of methyl myristate, and 231 parts of toluene. Then, the coating composition was coated and dried by a reverse roll coater in an amount of 15 g/m$^2$ on the surface of a released layer of a commercially available release paper, to form a first adhesive layer, which was then laminated to a polyester film of 50 g m thick, thereby obtaining an adhesive sheet.

Preparation of Sheet Set for Temperature Control

The above recording sheet and adhesive sheet were set to obtain a sheet set for temperature control.

EXAMPLES 18 TO 22

Sheet sets for temperature control were prepared in the same manner as in Example 17 except that the following compounds were used in place of 10 parts of methyl myristate in the preparation of the adhesive sheet.
Example 18: 10 parts of n-decyl caprate
Example 19: 10 parts of benzyl laurate
Example 20: 10 parts of methyl stearate
Example 21: 10 parts of ethyl stearate
Example 22: 3 parts of dihexyl adipate, 4 parts of dioctyl adipate and 3 parts of didecyl adipate

EXAMPLE 23

A sheet set for temperature control was prepared in the same manner as in Example 14 except that 3 parts of dihexyl adipate, 4 parts of dioctyl adipate and 3 parts of didecyl adipate were used in place of 10 parts of methyl myristate in the preparation of the adhesive sheet.

EXAMPLE 24

A sheet set for temperature control was obtained in the same manner as in Example 17 except that a coating composition for a second adhesive layer which comprises an acrylic adhesive latex having a solid content of 40% was coated and dried by a reverse roll coater in an amount of 20 g/m$^2$ after drying, on the surface of a released layer of a commercially available release paper, to form a second adhesive layer, which was then laminated to the other surface of the synthetic paper of the recording sheet prepared in Example 17, thereby obtaining a recording sheet.

Comparative Examples 1 to 4

Sheet sets for temperature control were prepared in the same manner as in Example 1 except that the following compounds were used in place of 10 parts of methyl myristate in the preparation of the adhesive sheet.
Comparative Example 1: 10 parts of n-nonyl alcohol
Comparative Example 2: 10 parts of n-dodecane
Comparative Example 3: 10 parts of dimethyl phthalate
Comparative Example 4: 10 parts of polyethylene glycol (MW 600)

Comparative Examples 5 and 6

Sheet sets for temperature control were prepared in the same manner as in Example 1 except that the following compounds were used in place of zinc salt of 3,5-di(α-methylbenzyl)salicylic acid in the preparation of the recording sheet.

Comparative Example 5: activated clay
Comparative Example 6: 4,4'-isopropylidenediphenol Comparative Example 7

A sheet set for temperature control was prepared in the same manner as in Example 1 except that 10 parts of methyl myristate was not used in the preparation of the adhesive sheet.

Comparative Examples 8 and 9

Sheet sets for temperature control were prepared in the same manner as in Example 17 except that the following compounds were used in place of 10 parts of methyl myristate in the preparation of the adhesive sheet.
Comparative Example 8: 10 parts of decyl alcohol
Comparative Example 9: 10 parts of dimethyl phthalate
Evaluation tests were conducted for the sheet sets for temperature control obtained. Tables 1 and 2 show the results.

Evaluation Test for Freezing
(A) Adhesive Strength
Under temperature conditions shown in Table 1, each of the above adhesive sheets was peeled off by the Instron type testing machine at the angle of 180° and tensile speed of 300 mm/minute, to measure the load (g/25 mm) at that time, according to JIS Z 0237 (the adherend: polyethylene).
(B) Transparency
After the adhesive sheets of Examples 1 to 16 and Comparative Examples 1 to 7 were left for a week under the temperature conditions shown in Table 1, their release papers were peeled off and their transparencies were checked with unaided eye.
Symbol "○" means to have a very high transparency;
Symbol "Δ" means that although it is slightly opaque, causing no problem in practical use; and
Symbol "x" means to be completely opaque.
(C) Color Forming Ability
With respect to all the sheet sets for temperature control, the adhesive sheet was laminated to the surface of the recording layer of the recording sheet through the first adhesive layer Immediately after this, they were left under the temperature conditions shown in Table 1, to measure the time required until the optical density of the colored portion reached 0.5, by a Macbeth densitometer (Model RD-914 with a blue filter, Macbeth Corp.).
(D) Freeze-Preservation Properties
Immediately after the respective adhesive sheets were laminated to the surface of the recording layer of the recording sheet through the first adhesive layer, they were preserved in a freezer under the temperature conditions shown in Table 1. One month later, the density of the colored portion was measured by a Macbeth densitometer.
(E) Coloring Forming Ability at Room Temperature
The respective sheet sets for temperature control were left in a room at 20° C. for 10 days, to measure the density of the colored portion by a Macbeth densitometer.

Evaluation Test for Cold Storage

With respect to the sheet sets for temperature control of Examples 4, 5, 20, 21, and Comparative Example 7, the evaluation test for cold storage was conducted in the same manner as in the above evaluation test for freezing. The results were shown in Table 2.

TABLE 1

| | (A) | | (B) | | (C) | | (D) | | (E) | |
|---|---|---|---|---|---|---|---|---|---|---|
| | temp. | value | temp. | estimation | temp. | value | temp. | value | temp. | value |
| Ex. 1 | −20° C. | 630 | −20° C. | ○ | −5° C. | 2.5 | −18° C. | 0.09 | 20° C. | 0.72 |
| Ex. 2 | −20° C. | 640 | −20° C. | ○ | −5° C. | 2 | −18° C. | 0.09 | 20° C. | 0.70 |
| Ex. 3 | −20° C. | 650 | −20° C. | ○ | −5° C. | 2 | −18° C. | 0.09 | 20° C. | 0.68 |
| Ex. 6 | −30° C. | 600 | −30° C. | ○ | −10° C. | 3 | −18° C. | 0.09 | 20° C. | 0.71 |
| Ex. 7 | −30° C. | 600 | −30° C. | ○ | −10° C. | 2 | −30° C. | 0.09 | 20° C. | 0.62 |
| Ex. 8 | −30° C. | 600 | −30° C. | ○ | −10° C. | 3 | −30° C. | 0.09 | 20° C. | 0.69 |
| Ex. 9 | −30° C. | 600 | −30° C. | ○ | −10° C. | 3 | −30° C. | 0.09 | 20° C. | 0.74 |
| Ex. 10 | −20° C. | 630 | −20° C. | ○ | −5° C. | 4 | −18° C. | 0.09 | 20° C. | 0.52 |
| Ex. 11 | −20° C. | 630 | −20° C. | ○ | −5° C. | 4 | −18° C. | 0.09 | 20° C. | 0.53 |
| Ex. 12 | −20° C. | 630 | −20° C. | ○ | −5° C. | 1.5 | −18° C. | 0.09 | 20° C. | 0.65 |
| Ex. 13 | −20° C. | 600 | −20° C. | ○ | −5° C. | 3.5 | −18° C. | 0.09 | 20° C. | 0.77 |
| Ex. 14 | −20° C. | 630 | −20° C. | ○ | −5° C. | 5 | −18° C. | 0.09 | 20° C. | 0.60 |
| Ex. 15 | −20° C. | 630 | −20° C. | ○ | −5° C. | 2.5 | −18° C. | 0.09 | 20° C. | 0.72 |
| Ex. 16 | −20° C. | 630 | −20° C. | ○ | −5° C. | 2 | −18° C. | 0.09 | 20° C. | 0.71 |
| Ex. 17 | −20° C. | 640 | −20° C. | ○ | 5° C. | 4 | −18° C. | 0.09 | 20° C. | 0.81 |
| Ex. 18 | −20° C. | 640 | −20° C. | ○ | 5° C. | 4.5 | −18° C. | 0.09 | 20° C. | 0.77 |
| Ex. 19 | −20° C. | 650 | −20° C. | ○ | 5° C. | 4 | −18° C. | 0.09 | 20° C. | 0.80 |
| Ex. 22 | −30° C. | 610 | −30° C. | ○ | −10° C. | 6 | −30° C. | 0.09 | 20° C. | 0.82 |
| Ex. 23 | −30° C. | 640 | −30° C. | ○ | −10° C. | 5 | −30° C. | 0.09 | 20° C. | 0.80 |
| Ex. 24 | −20° C. | 640 | −20° C. | ○ | 5° C. | 4 | −18° C. | 0.09 | 20° C. | 0.80 |
| Com. Ex. 1 | −30° C. | 180 | −30° C. | ○ | −10° C. | 30 | −30° C. | 0.09 | 20° C. | 0.52 |
| Com. Ex. 2 | −30° C. | 520 | −30° C. | Δ | −10° C. | 48 | −30° C. | 0.17 | 20° C. | 0.28 |
| Com. Ex. 3 | −20° C. | 480 | −20° C. | x | −5° C. | 2 | −18° C. | 0.63 | 20° C. | 0.22 |
| Com. Ex. 4 | −20° C. | 40 | −20° C. | Δ | −5° C. | — | −18° C. | 0.15 | 20° C. | 0.15 |
| Com. Ex. 5 | −20° C. | 630 | −20° C. | ○ | −5° C. | — | −18° C. | 0.09 | 20° C. | 0.09 |
| Com. Ex. 6 | −20° C. | 630 | −20° C. | ○ | −5° C. | — | −18° C. | 0.09 | 20° C. | 0.09 |
| Com. Ex. 8 | −20° C. | 180 | −20° C. | ○ | 5° C. | 48 | −18° C. | 0.09 | 20° C. | 0.33 |
| Com. Ex. 9 | −20° C. | 470 | −20° C. | x | 5° C. | 5 | −18° C. | 0.59 | 20° C. | 0.29 |

(A): adhesive strength (g/25 mm)
(B): transparency
(C). color forming ability (hour)
(D): freeze-preservation properties
(E): coloring forming ability at room temperature (hour)

TABLE 2

| | (A) | | (B) | | (C) | | (D) | | (E) | |
|---|---|---|---|---|---|---|---|---|---|---|
| | temp. | value | temp. | estimation | temp. | value | temp. | value | temp. | value |
| Ex. 4 | 0° C. | 650 | 0° C. | ○ | 20° C. | 4 | 5° C. | 0.09 | 20° C. | 0.85 |
| Ex. 5 | 0° C. | 650 | 0° C. | ○ | 20° C. | 2 | 5° C. | 0.09 | 20° C. | 0.83 |
| Ex. 20 | 0° C. | 630 | 0° C. | ○ | 20° C. | 5 | 5° C. | 0.09 | 20° C. | 0.84 |
| Ex. 21 | 0° C. | 640 | 0° C. | ○ | 20° C. | 3 | 5° C. | 0.09 | 20° C. | 0.82 |
| Com. Ex. 7 | 0° C. | 660 | 0° C. | ○ | 20° C. | - | 5° C. | 0.09 | 20° C. | 0.11 |

As apparent from the above results, the sheet set for temperature control of the present invention is excellent in laminability and transparency at low temperatures, and is capable of easily detecting whether articles or spaces have been kept under a predetermined temperature.

What is claimed is:

1. A sheet set for temperature control comprising:
   a recording sheet on one surface of a substrate, the recording sheet having a recording layer incorporating a zinc salt of a salicylic acid derivative; and
   an adhesive sheet on one surface of another substrate, the adhesive sheet having a first adhesive layer incorporating an adhesive, a leuco dye, and at least one of ester derivatives of the formula (1) or formula (2)

$$R_1\text{—COO—}R_2 \tag{1}$$

wherein $R_1$ is $C_9\text{~}C_{17}$ alkyl, and $R_2$ is $C_1\text{~}C_{12}$ alkyl or benzyl, $$R_3\text{—OOC—}R_5\text{—COO—}R_4 \tag{2}$$

wherein $R_3$ and $R_4$ are each $C_1\text{~}C_{18}$ alkyl or benzyl, and $R_5$ is $C_0\text{~}C_{10}$ alkylene.

2. A sheet set for temperature control comprising:
   a recording sheet on one surface of a substrate, the recording sheet having a recording layer incorporating a leuco dye; and
   an adhesive sheet on one surface of another substrate, the adhesive sheet having a first adhesive layer incorporating an adhesive, a zinc salt of a salicylic acid derivative, and at least one of ester derivatives of the formula (1) or (2) as defined in claim 1.

3. A sheet set for temperature control comprising:
   a recording sheet on one surface of a substrate, the recording sheet having a recording layer incorporating a leuco dye and a zinc salt of a salicylic acid derivative; and
   an adhesive sheet on one surface of another substrate, the adhesive sheet having a first adhesive layer incorporating an adhesive and at least one of ester derivatives of the formula (1) or (2) as defined in claim 1.

4. A sheet set for temperature control as defined in claim 1 wherein the ester derivative of the formula (1) or (2) is contained in the amount of 3 to 30% by weight of the adhesive.

5. A sheet set for temperature control as defined in claim 1 wherein the zinc salt of the salicylic acid derivative is at least one of zinc salt of 3,5-di($\alpha$-methylbenzyl)salicylic acid, a zinc salt of a terpenized salicylic acid and a zinc salt of a benzylated styrenized salicylic acid.

6. A sheet set for temperature control as defined in claim 1 wherein the adhesive is an acrylic adhesive.

7. A sheet set for temperature control as defined in claim 1 wherein a second adhesive layer incorporating an adhesive is provided on the other surface of the recording sheet or the other surface of the adhesive sheet.

8. A method of using a sheet set for temperature control which is characterized in that the recording sheet and the adhesive sheet are laminated on the surface of the recording layer through the first adhesive layer, in the sheet set for temperature control of any of claims 1 to 7.

* * * * *